United States Patent
Merlin

(10) Patent No.: US 11,438,911 B2
(45) Date of Patent: Sep. 6, 2022

(54) SYSTEM AND METHOD OF MODES FOR DATA TRANSMISSION

(71) Applicant: QUALCOMM Incorporated, San Diego, CA (US)

(72) Inventor: Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 16/940,222

(22) Filed: Jul. 27, 2020

(65) Prior Publication Data

US 2021/0014871 A1    Jan. 14, 2021

Related U.S. Application Data

(63) Continuation of application No. 16/132,258, filed on Sep. 14, 2018, now Pat. No. 10,728,912.

(60) Provisional application No. 62/559,478, filed on Sep. 15, 2017.

(51) Int. Cl.
| | |
|---|---|
| *H04W 72/12* | (2009.01) |
| *H04L 1/16* | (2006.01) |
| *H04L 1/18* | (2006.01) |
| *H04W 16/14* | (2009.01) |
| *H04W 74/08* | (2009.01) |

(52) U.S. Cl.
CPC .......... *H04W 72/12* (2013.01); *H04L 1/1685* (2013.01); *H04L 1/1887* (2013.01); *H04W 16/14* (2013.01); *H04W 74/0808* (2013.01)

(58) Field of Classification Search
CPC . H04W 72/12; H04W 16/14; H04W 74/0808; H04L 1/1685; H04L 1/1887
See application file for complete search history.

(56) References Cited

U.S. PATENT DOCUMENTS

| 10,728,912 B2 | 7/2020 | Merlin | |
|---|---|---|---|
| 2009/0296631 A1* | 12/2009 | Takahashi | H04W 56/001 370/328 |
| 2011/0116435 A1 | 5/2011 | Liu et al. | |

(Continued)

FOREIGN PATENT DOCUMENTS

| CN | 104717760 A | 6/2015 |
|---|---|---|
| CN | 105144641 A | 12/2015 |

(Continued)

OTHER PUBLICATIONS

International Search Report and Written Opinion—PCT/US2018/051252—ISA/EPO—Mar. 6, 2019.

*Primary Examiner* — Shailendra Kumar
(74) *Attorney, Agent, or Firm* — Arent Fox, LLP

(57) ABSTRACT

In an aspect of the disclosure, a method, a computer-readable medium, and an apparatus are provided. The apparatus obtain a signal from a remote wireless node. The apparatus may switch between a first mode and a second mode in response to the signal. The apparatus may sense the shared transmission medium and sense if an absence of traffic is detected. The apparatus may delay data transmission for a fixed time interval from detecting the absence of traffic. The apparatus may initiate the data transmission at the end of the fixed time interval if operating in the first mode or initiate the data transmission at the end of a random time interval following the fixed time interval if operation in the second mode.

30 Claims, 10 Drawing Sheets

(56) References Cited

U.S. PATENT DOCUMENTS

| | | | |
|---|---|---|---|
| 2016/0105858 A1* | 4/2016 | Damnjanovic | H04W 74/08 370/329 |
| 2016/0381706 A1* | 12/2016 | Huang | H04W 74/0808 370/329 |
| 2017/0041951 A1* | 2/2017 | Yin | H04W 74/04 |
| 2017/0086214 A1* | 3/2017 | Kalhan | H04W 72/0446 |
| 2017/0325252 A1* | 11/2017 | Dickey | H04W 72/1215 |
| 2019/0069324 A1* | 2/2019 | Ansari | H04W 72/0453 |

FOREIGN PATENT DOCUMENTS

| | | |
|---|---|---|
| CN | 105612803 A | 5/2016 |
| CN | 105704835 A | 6/2016 |
| WO | 2016099139 A1 | 6/2016 |
| WO | 2016200303 A1 | 12/2016 |

* cited by examiner

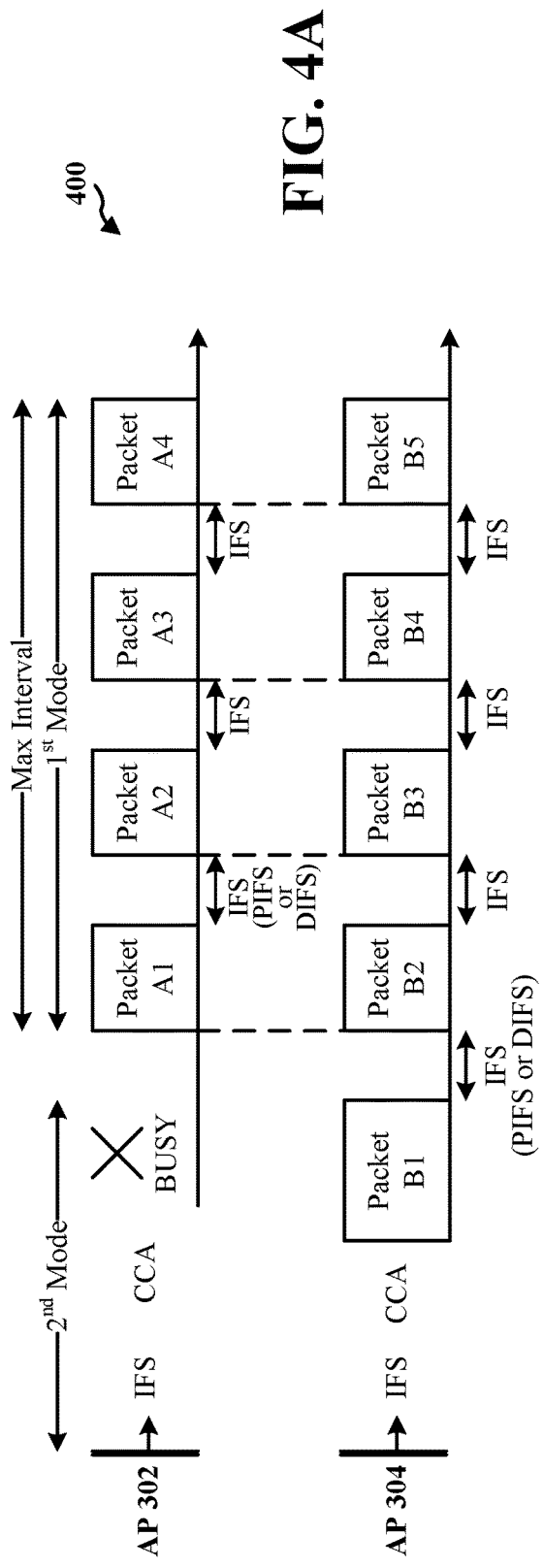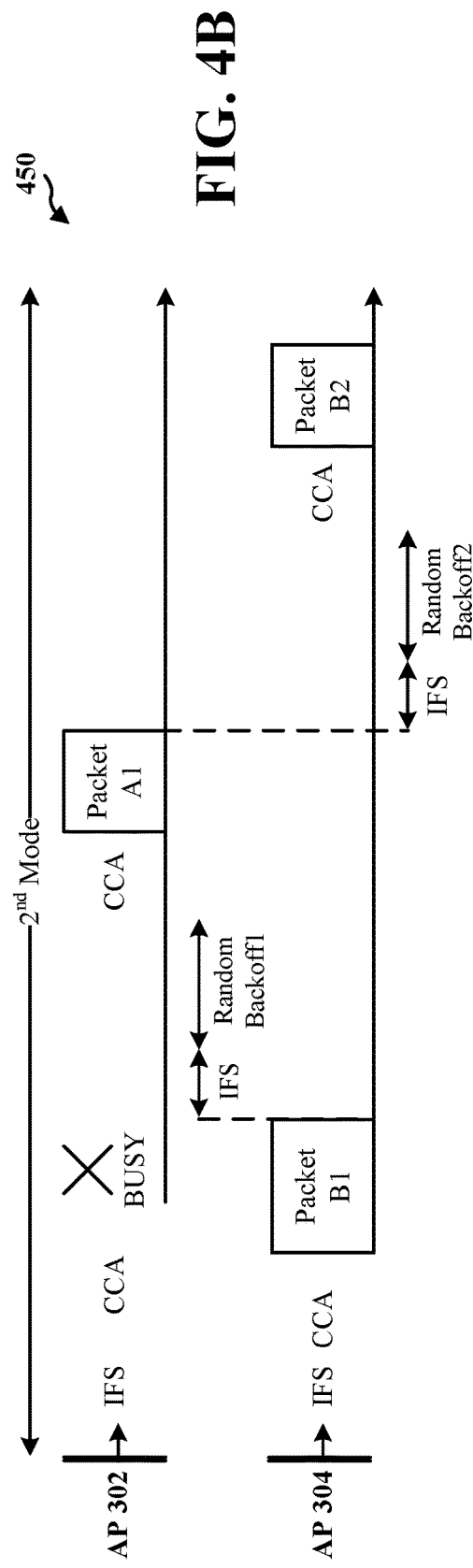
FIG. 4A
FIG. 4B

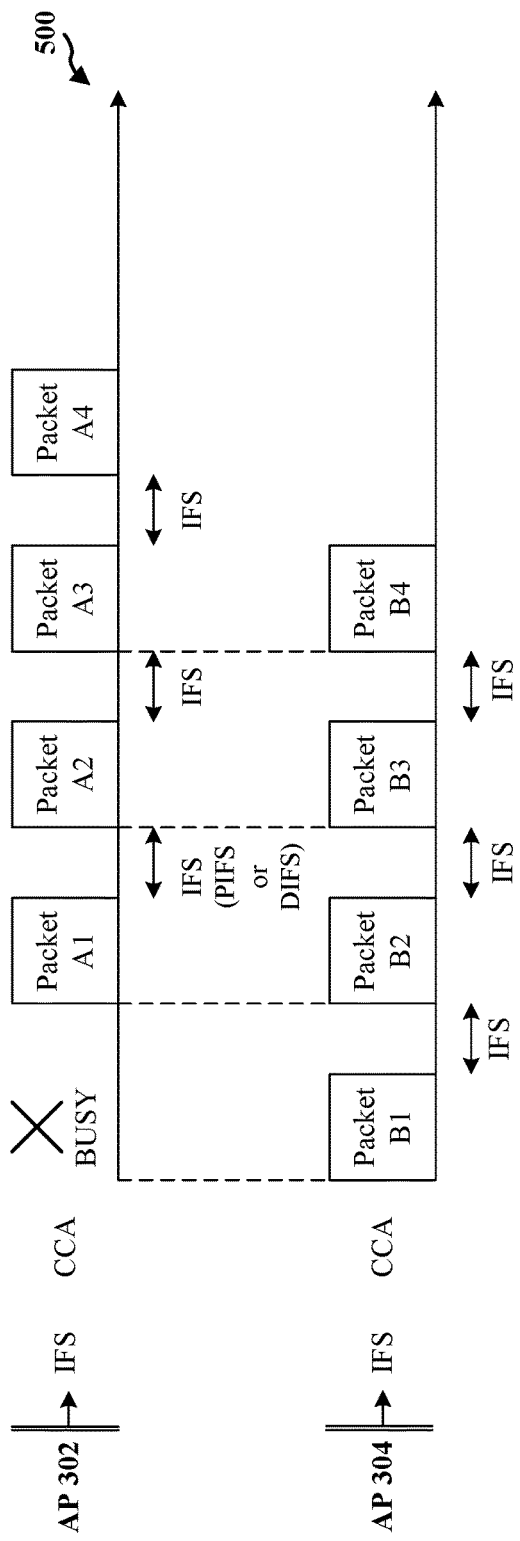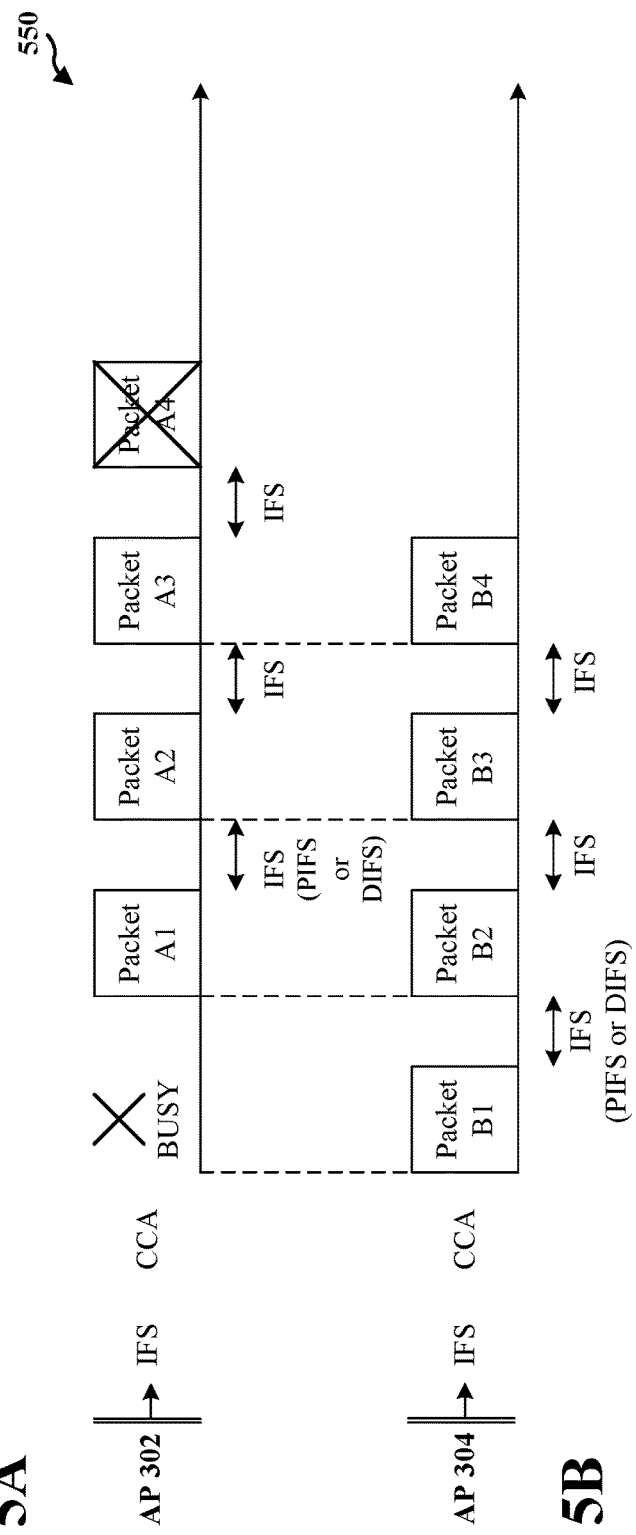
FIG. 5A
FIG. 5B

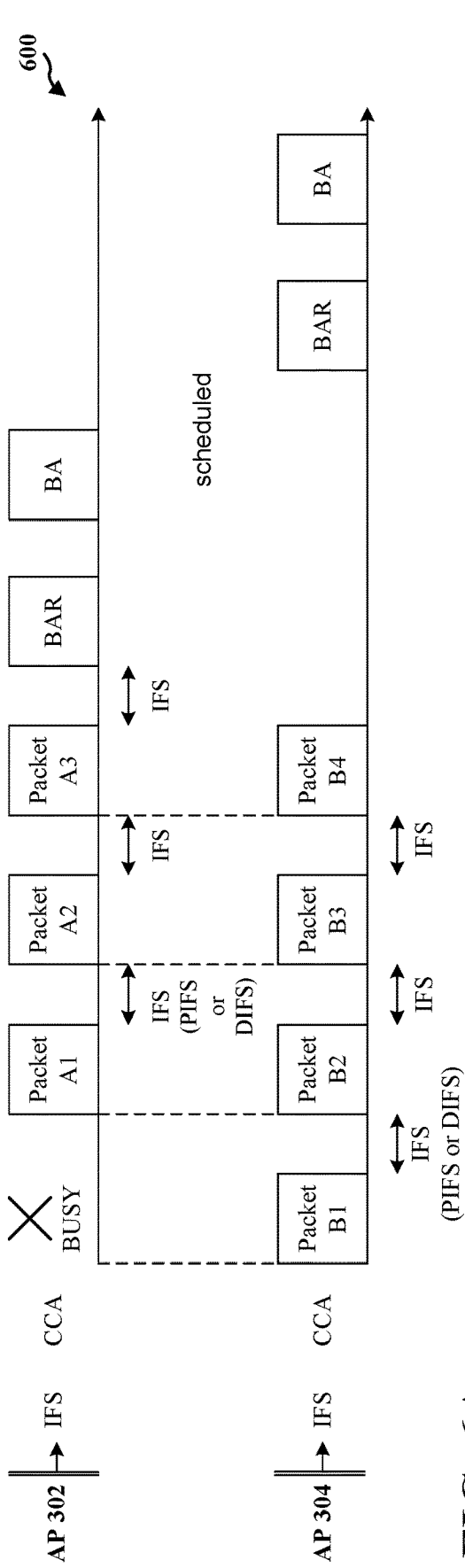
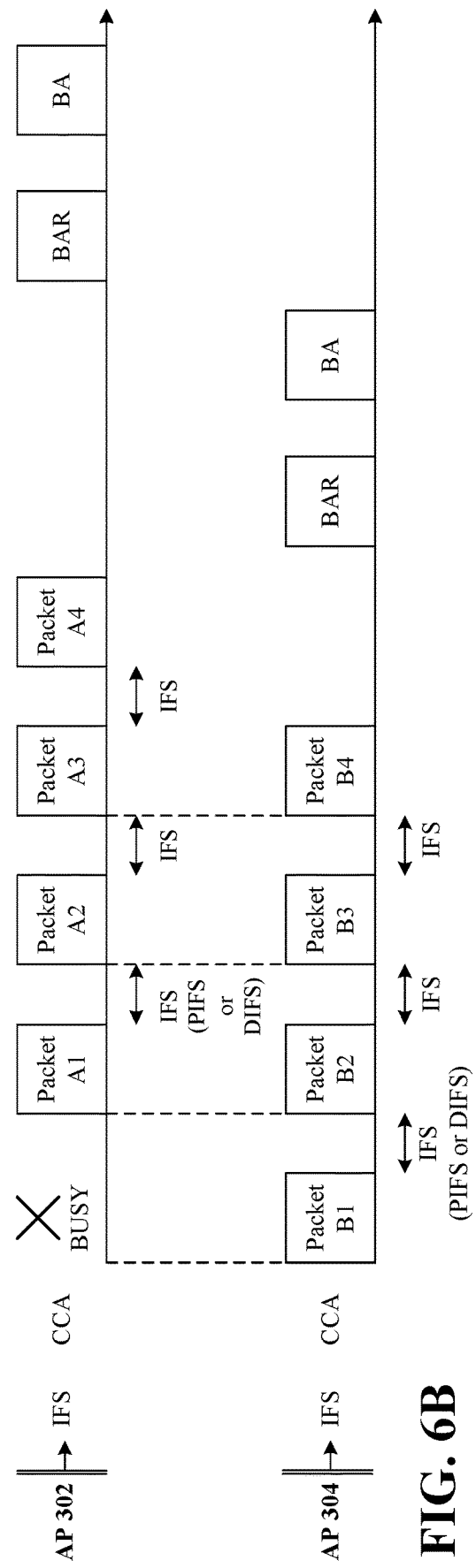
FIG. 6A
FIG. 6B

SYSTEM AND METHOD OF MODES FOR DATA TRANSMISSION

CROSS-REFERENCE TO RELATED APPLICATION(S)

This application is a Continuation of U.S. Non-Provisional application Ser. No. 16/132,258, entitled "SYSTEM AND METHOD OF MODES FOR DATA TRANSMISSION" and filed on Sep. 14, 2018, which claims priority of U.S. Provisional Application Ser. No. 62/559,478, entitled "SYNCHRONIZED MEDIUM REUSE SEQUENCE" and filed on Sep. 15, 2017, both of which are expressly incorporated by reference herein in its entirety.

BACKGROUND

Field

The present disclosure relates generally to communication systems, and more particularly, to transmitting data according to different modes.

Background

Communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The following disclosure describes methods, techniques, and protocols for synchronization transmissions (e.g., from access points) that are within range. Such transmission may be well synchronized (e.g., within 1.5 µs when the fixed interval is a PIFS) to allow a receiver to lock into a desired packet and to achieve a lower packet error rate (PER).

In an aspect of the disclosure, a method, a computer-readable medium, and an apparatus are provided. The apparatus may include a first interface configured to obtain a signal from a wireless node; and a processing system configured to: select operation in a first mode or a second mode in the response to the signal; detect an absence of traffic on the shared medium during a fixed time interval; and initiate the data transmission at the end of the fixed time interval if operating in the first mode or initiate the data transmission at the end of a random time interval following the fixed time interval if operating in the second mode. In an aspect, the processing system is further configured to initiate the data transmission in the first mode by generating a plurality of data frames separated by the fixed time interval, and the apparatus further comprising: a second interface configured to output the plurality of data frames for transmission. In an aspect, the processing system is further configured to terminate the data transmission if a time period associated with the data transmission exceeds a maximum time interval, the time period being after the initiation of the data transmission. In an aspect, the processing system is further configured to: generate a block acknowledgement request, and schedule transmission of the block acknowledgement request following the maximum time interval; and the apparatus further comprising a second interface configured to output the block acknowledgement request for the scheduled transmission. In an aspect, the processing system is further configured to initiate transmission of a block acknowledgement if another absence of traffic is detected on the shared medium following an end of the data transmission. In an aspect, the processing system is further configured to monitor the shared medium to determine one or more parameters and provide the one or more parameters to a remote wireless node. In an aspect, the one or more parameters comprise at least one of received signal strength from a wireless node in communication with the apparatus or detected interference associated with the shared medium.

In an aspect, the apparatus may include means for obtaining a signal from a wireless node. The apparatus may include means for selecting operation in a first mode or a second mode in the response to the signal. The apparatus may include means for detecting an absence of traffic on the shared medium during a fixed time interval. The apparatus may include means for initiating the data transmission at the end of the fixed time interval if operating in the first mode or initiate the data transmission at the end of a random time interval following the fixed time interval if operating in the second mode. In an aspect, the means for initiating the data transmission is configured to generate a plurality of data frames separated by the fixed time interval, and to output the plurality of data frames for transmission. In an aspect, the apparatus may include means for terminating the data transmission if a time period associated with the data transmission exceeds a maximum time interval, the time period being after the initiation of the data transmission. In an aspect, the apparatus may include means for generating a block acknowledgement request; means for scheduling transmission of the block acknowledgement request following the maximum time interval; and means for outputting the block acknowledgement request for the scheduled transmission. In an aspect, the apparatus may include means for initiating transmission of a block acknowledgement if another absence of traffic is detected on the shared medium following an end of the data transmission. In an aspect, the apparatus may include means for monitoring the shared medium to determine one or more parameters and providing the one or more parameters to a remote wireless node. In an aspect, the one or more parameters comprise at least one of received signal strength from a wireless node in communication with the apparatus or detected interference associated with the shared medium.

The method may include obtaining a signal from a wireless node; selecting operation in a first mode or a second mode in the response to the signal; detecting an absence of traffic on the shared medium during a fixed time interval; and initiating the data transmission at the end of the fixed time interval if operating in the first mode or initiate the data transmission at the end of a random time interval following the fixed time interval if operating in the second mode. In an aspect, the initiating the data transmission in the first mode comprises: generating a plurality of data frames separated by the fixed time interval; and outputting the plurality of data frames for transmission. The method may further include terminating the data transmission if a time period associated with the data transmission exceeds a maximum time interval, the time period being after the initiation of the data transmission. The method may further include generating a block acknowledgement request; scheduling transmission of the block acknowledgement request following the maximum time interval; and outputting the block acknowledgement request for the scheduled transmission. The method may further include initiating transmission of a block acknowledgement if another absence of traffic is detected on the shared medium following an end of the data transmission. The method may further include monitoring the shared medium to determine one or more parameters and providing the one or more parameters to a remote wireless node. In an aspect, the one or more parameters comprise at least one of received signal strength from a wireless node in communication with the apparatus or detected interference associated with the shared medium.

The computer-readable medium may include codes for wireless communication executable to cause an apparatus to: obtain a signal from a wireless node; select operation in a first mode or a second mode in the response to the signal; detect an absence of traffic on a shared medium during a fixed time interval; and initiate the data transmission at the end of the fixed time interval if operating in the first mode or initiate the data transmission at the end of a random time interval following the fixed time interval if operating in the second mode.

A wireless node for wireless communications on a shared transmission medium, may be provided. The wireless node including a receiver configured to receive a signal from a wireless node; and a processing system configured to: select operation in a first mode or a second mode in the response to the signal; detect an absence of traffic on the shared medium during a fixed time interval; and initiate the data transmission at the end of the fixed time interval if operating in the first mode or initiate the data transmission at the end of a random time interval following the fixed time interval if operating in the second mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4A and 4B illustrate diagrams of an AP operating in a first mode and a second mode.

FIGS. 5A and 5B illustrate diagrams related to sequence robustness.

FIGS. 6A and 6B illustrates diagrams for acknowledging transmissions in a synchronized sequence.

DETAILED DESCRIPTION

Figure 1:
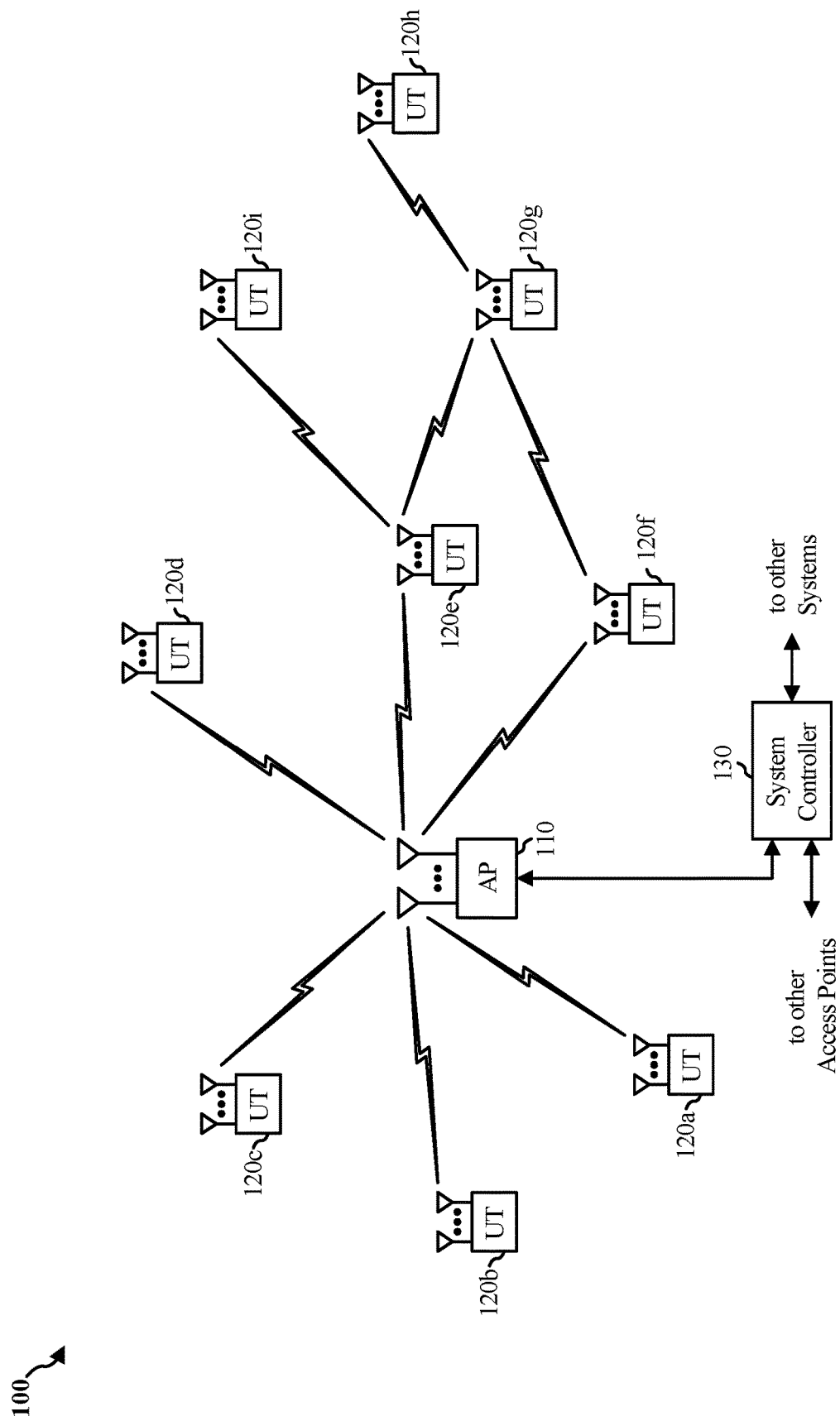
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ES S"), a Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, one or more user terminals 120 may signal capabilities (e.g., to access point 110) using the techniques provided herein.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless node, a wireless node, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
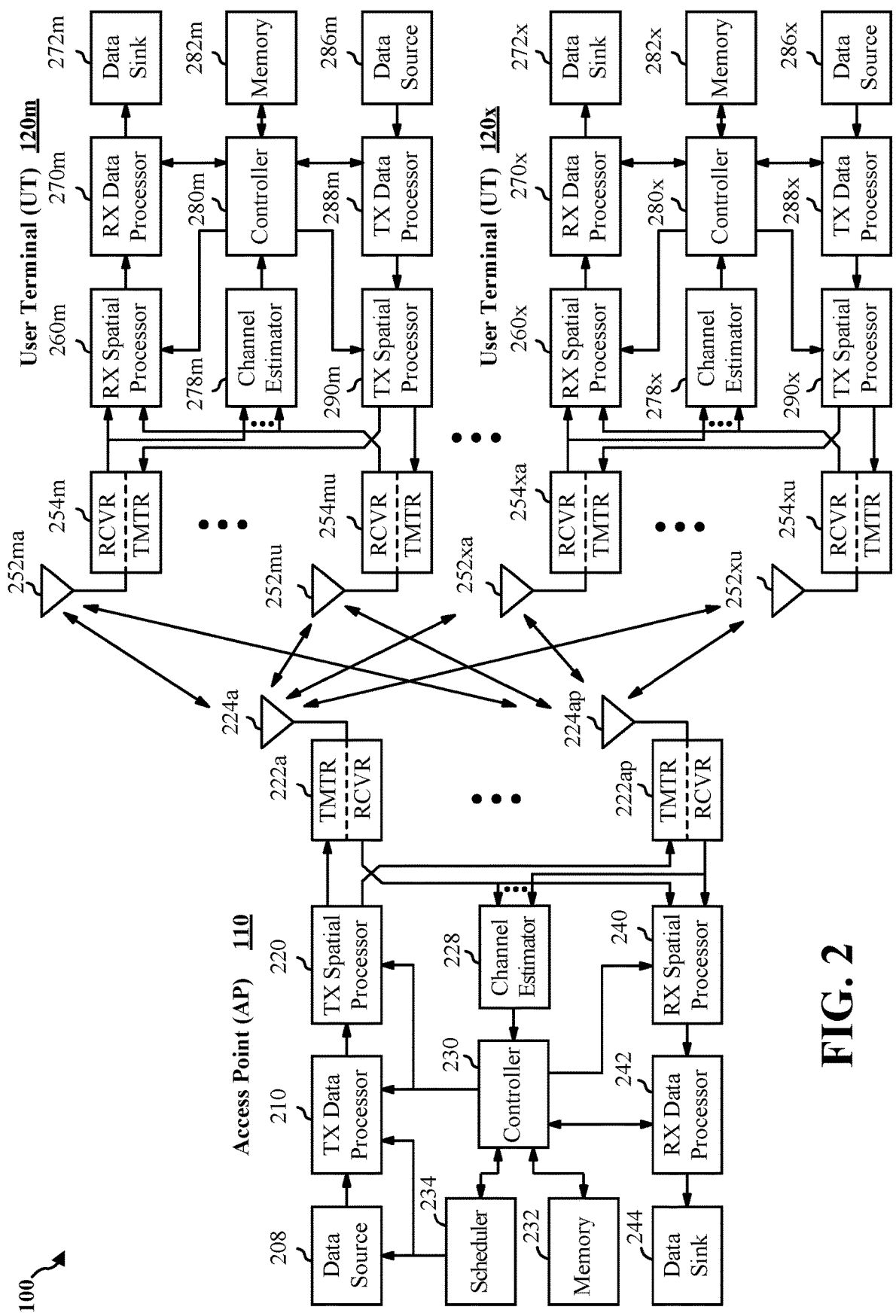
FIG. 2 illustrates a block diagram of an example access point (AP) and user terminals (UTs), in accordance with certain aspects of the present disclosure.

FIG. 2 illustrates a block diagram of access point 110 and two user terminals 120m and 120x in MIMO system 100 that may be examples of the access point 110 and user terminals 120 described above with reference to FIG. 1 and capable of performing the techniques described herein. The various processors shown in FIG. 2 may be configured to perform (or direct a device to perform) various methods described herein.

The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $Nu_{up}$ user terminals simultaneously transmit on the uplink, while $N_{dn}$ user terminals are simultaneously transmitted to on the downlink by the access point 110. $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In a Wi-Fi network, wireless devices such as APs and STAs may perform a clear channel assessment (CCA) to determine whether a transmission channel is busy or idle for purposes of determining whether data may be transmitted to another wireless device. A CCA has two components: carriers sense (CS) and energy detection. Carrier sense refers to an ability of a wireless device (e.g., AP or STA) to detect and decode incoming Wi-Fi preambles having information that enables the receiver to acquire a wireless signal from and synchronize with the transmitter, from other wireless devices. For example, a first AP may broadcast a Wi-Fi signal preamble, and the Wi-Fi signal preamble may be detected by a second AP or a STA. Similarly, a third AP may broadcast a Wi-Fi signal preamble, and the Wi-Fi signal preamble may be detected by the second AP. When the second AP detects one or more of the Wi-Fi signal preambles, the second AP may determine that the transmission channel is busy and may not transmit data. The CCA may remain busy for the length of a transmission frame associated with the Wi-Fi preambles.

The second component of CCA is energy detection, which refers to the ability of a wireless device to detect an energy level present on a transmission channel. The energy level may be based on different interference sources, Wi-Fi transmissions, a noise floor, and/or ambient energy. Wi-Fi transmissions may include unidentifiable Wi-Fi transmissions that have been corrupted or are so weak that the transmission can no longer be decoded. Unlike carrier sense, in which the exact length of time for which a transmission channel is busy may be known, energy detection uses periodic sampling of a transmission channel to determine if the energy exists. Additionally, energy detection may require at least one threshold used to determine whether the reported energy level is adequate to report the transmission channel as busy or idle. This energy level may be referred to as the ED level/ED threshold level or the CCA sensitivity level. For example, if an ED level is above a threshold, a wireless device may defer to other devices by refraining from transmitting.

In one aspect of communicating over a medium, a device may reduce transmit power, which may lead to loss of coverage or throughput. Another possibility is to increase the CCA threshold (e.g., an energy detection level threshold), but doing so may create issues with coexistence. As such, a need exists to enable medium coexistence without excessively diminishing throughput or creating coexistence problems.

Figure 3:
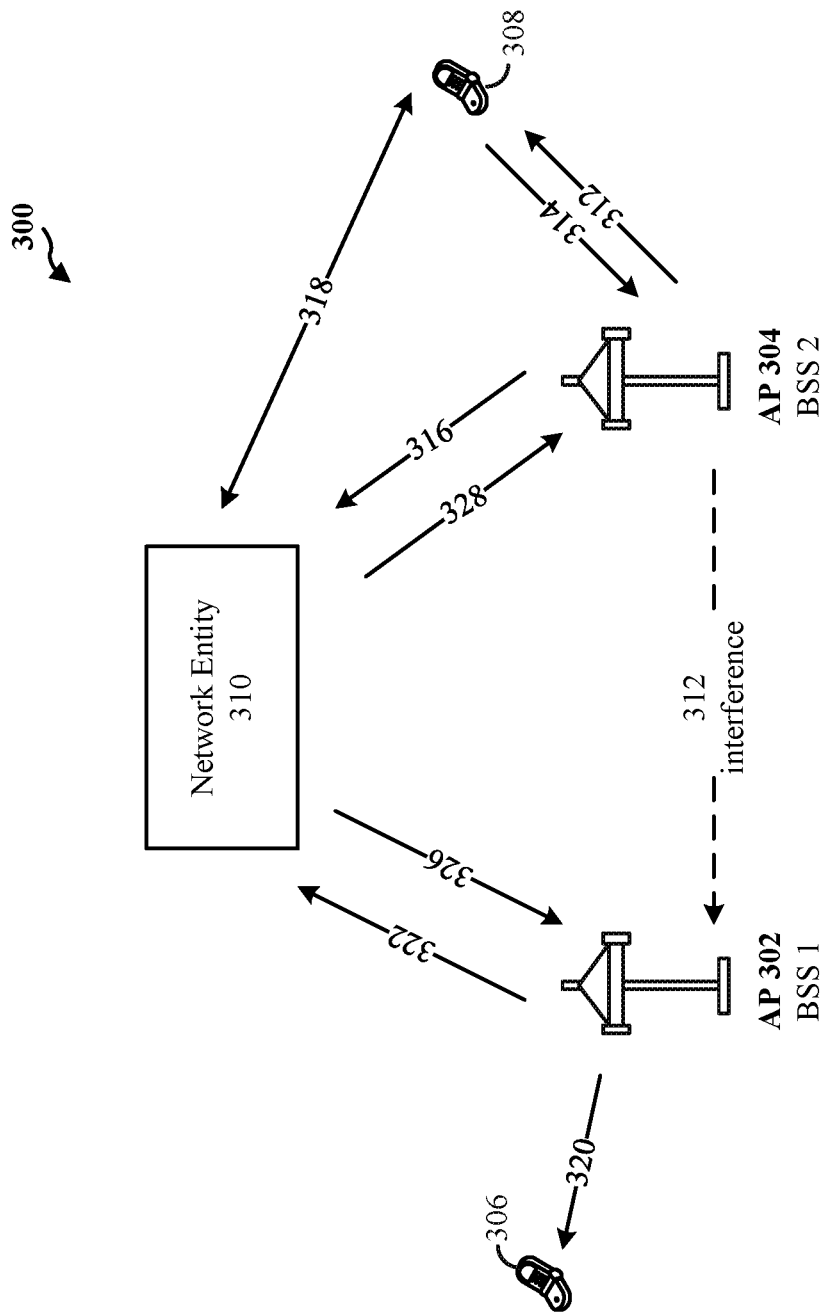
FIG. 3 illustrates an exemplary method for communication over a medium.

FIG. 3 illustrates an exemplary method 300 for communicating over a medium. Referring to FIG. 3, a first AP 302 and a first STA 306 may be associated with a first BSS (BSS 1). A second AP 304 and a second STA 308 may be associated with a second BSS (BSS 2). The first AP 302 may be within CCA range of the second AP 304. In various aspects, the first AP 302 and/or the second AP 304 may monitor the shared transmission medium to determine one or more parameters. In one aspect, the second AP 304 may send, on a channel, a first transmission 312 to the second STA 308. In an aspect, the second STA 308 may measure the received signal strength indicator (RSSI) of the first transmission 312, and provide the RSSI measurement in a first feedback message 314 to the second AP 304.

Referring to FIG. 3, the first transmission 312 from the second AP 304 may cause interference to the first AP 302 associated with the first BSS. In one configuration, upon detecting the first transmission 312 (e.g., a preamble is detected or energy detection level is above a threshold), the first AP 302 may refrain from the transmitting because the medium is busy. In one configuration, the first AP 302 may detect interference based on detecting the first transmission 312, such as by detecting energy associated with the first transmission 312.

In an aspect, in a first mode, the first AP 302 may transmit a number of data frames in which each transmission is separated by a fixed time interval. In this first mode, each data frame may be transmitted concurrently with another data frame transmitted by the second AP 304. In a second mode, one or more of the APs 302, 304 may transmit data frames at different times. For example, the first AP 302 may transmit a data frame at the end of a random time interval following a fixed time interval. The second AP 304 may transmit a data frame at the end of a different random time interval following a fixed time interval.

In an aspect, although FIG. 3 depicts the network entity 310 as a separate entity within a network managing a medium, the network entity 310 may also be a component within the first AP 302 and/or the second AP 304. The network entity 310 may communicate with the first AP 302 and/or the second AP 304 (e.g., over communication link 318).

FIGS. 4A and 4B illustrate diagrams 400, 450 of an AP operating in a first mode and a second mode. Referring to FIG. 4A, both the first AP 302 and the second AP 304 may have data for transmission. After an interframe space (IFS) such as a point coordination function (PCF) interframe space (PIFS) or a distributed coordination function (DCF) interframe space (DIFS), the first and second APs 302, 304 may perform CCA. Based on the CCA, the second AP 304 may determine that the medium is available and may transmit Packet B1 (e.g., the first transmission 312) after performing CCA. The first AP 302 may perform CCA as well and detect the packet transmission (Packet B1). In one configuration, the first AP 302 may determine that the medium or channel is busy and may not transmit. In another configuration, based on a first channel information message 316 and/or a third channel information message 322, the network entity 310 may instruct the first AP 302 to operate in the first mode (via the first control message 326) and may instruct the second AP 304 to operate in the first mode (e.g., via a second control message 328) to increase usage of a medium. In the first mode, first AP 302 may wait for the transmission of Packet B1 to finish. After a fixed interval (e.g., an IFS), during which the first and second APs 302, 304 detect the absence of traffic (e.g., no traffic is detected after Packet B1 was transmitted), the first AP 302 may transmit Packet A1 (e.g., the second transmission 320) concurrently as the second AP 304 transmits packet B2. After another fixed interval (e.g., PIFS or DIFS), the first AP 302 may transmit Packet A2 concurrently with the second AP 304's transmission of the Packet B3. After another fixed interval, the first AP 302 may transmit Packet A3 concurrently with the second AP 304's transmission of the Packet B4. And finally, the first AP 302 may transmit Packet A4 concurrently with the second AP 304's transmission of Packet B5. In an aspect, the APs may perform CCA during each of the fixed intervals.

In another aspect, one or more of the APs 302, 304 may follow a backoff procedure (e.g., a standard backoff procedure may be defined in one or more 802.11 specifications). Such a backoff procedure may use a certain an arbitration IFS (AIFS) and/or SLOT time parameters for the backoff countdown. If the medium is idle, according to CCA, for the AIFS time, one or more of the APs 302, 304 may decrement a backoff counter by 1, and then the one or more of the APs 302, 304 may further decrement the backoff counter by 1 for each consecutive SLOT time during which the medium keeps continuously idle. In an aspect, the AIFS may be equal to a short IFS (SIFS)+(1 SLOT)=PIFS; however, the AIFS may be larger.

Once the medium is accessed, the second AP 304 may transmit a sequence of at least one physical layer convergence procedure (PLCP) protocol data unit (PPDU) (e.g., PPDUs B1, B2, . . . , BN). Each of the PPDUs of the sequence may be separated by a same AIFS time. In some aspects, the AIFS is to be equal to the PIFS (e.g., based on certain conditions).

The first AP 302 may detect at least one of the PPDUs (e.g., B1), and the first AP 302 may halt backoff by the first AP 302, thereby deferring transmission by the first AP 302. Once the at least one PPDU (e.g., B1) ends, the first AP 302 may sense the medium for the AIFS time, and the first AP 302 may decrement the backoff counter by 1. If the backoff counter reaches 0, the first AP 302 may transmit a packet A1 (e.g., of a sequence of at least one PPDU). In some aspects, the first AP 302 may transmit the packet A1 contemporaneously (e.g., simultaneously) with the packet B2 of the at least one PPDU. Once the packet A1 is completed, the first AP 302 may perform channel sensing for the PIFS time and, if the channel is idle, the first AP 302 may transmit a packet A2. Similarly, once B2 is completed, the second AP 304 may perform channel sensing for the PIFS time and, if the channel is idle, the second AP 304 may transmit a packet B3. In some aspects, the first and/or second AP 302, 304 may refrain from additional SLOT time sensing, e.g., until the duration of the transmission sequence (e.g., of PPDUs) exceeds a transmit opportunity (TXOP) value.

While the first and second APs 302, 304 are in the first mode, the APs may concurrently transmit a sequence of packets. That is, the packets transmitted by the first AP 302 may be time synchronized with packets transmitted by the second AP 304. In an aspect, the packets may be of the same length and may be of relatively short lengths. In another aspect, the packets from the first AP 302 and the second AP 304 may be of different lengths but less than a threshold length. In another aspect, the packet length may be signaled by the network entity 310. As shown in FIG. 4A, the start of the packet transmissions, regardless of packet length, may be at approximately the same time. In another aspect, before transmitting the sequence of packets, each of the APs may first transmit a clear-to-send (CTS) packet indicating that each AP intends to utilize the shared medium for data transmission. The CTS packet may include a special address or indication that indicates other APs not to defer. In another aspect, each of the APs may conclude the sequence of packets with a CTS until the end of the maximum time interval.

As such, in the first mode, the APs may transmit a sequence of relatively short data frames all separated by an IFS (e.g., a PIFS). In an aspect, the IFS or the fixed interval may be specified by the network entity 310 and communicated to the first and second APs 302, 304. The first AP 302, which was deferring initially in the second mode, after entering the first mode, will wait until the end of the packet (e.g., Packet B1) and then collide on all of the following frames. As noted, even if the packet sizes are not the same length, synchronization may be preserved because one AP may wait for the other AP. In the sequence of packet transmissions in the first mode, the contention window for each AP may be set to 0 or some other common value between the APs. For example, the fixed time interval may be a DIFS or PIFS and the APs may transmit following a contention window in which the value is set to 0. In another aspect, instead of DIFS or PIFS, the APs may delay transmission for a SIFS.

In an aspect, the first and second APs 302, 304 may remain in the first mode and transmit a number of relatively short packets (or data frames) for a maximum time interval (e.g., 200 ms). Subsequently, after the maximum time interval, the first and second APs 302, 304 may terminate the transmission. In an aspect, the first and second APs 302, 304 may autonomously revert to the second mode without having received further signaling from the network entity 310. In another aspect, the first and the second APs 302, 304 may remain in the first mode until otherwise instructed by the network entity 310.

FIG. 4B illustrates the diagram 450 in which the first and second APs 302, 304 are operating in the second mode. In this mode, the first and second APs 302, 304 do not transmit over one another. In this mode, after an IFS after a transmission, both APs may perform CCA. The second AP 304 may perform CCA and determine that the medium is available and transmit Packet B1. The first AP 302 may perform CCA and detect Packet B1 and determine that the medium is busy. After Packet B1 is transmitted and after an IFS, the first AP 302 may wait for a random backoff time (shown as Random Backoff1 in FIG. 4B) and perform CCA again. If the medium is available, then the first AP 302 may transmit Packet A1. Subsequently, after an IFS after Packet A1 is transmitted, the second AP 304 may wait a random backoff time (shown as Random Backoff2 in FIG. 4B) and then perform CCA. If the medium is available, then the second AP 304 may transmit Packet B2. Unlike in FIG. 4A, the transmission times of the first and second APs 302, 304 are not aligned and each AP will defer when the other AP is transmitting.

FIGS. 5A and 5B illustrate diagrams 500, 550 related to sequence robustness. Even assuming fine time synchronization, one AP, e.g., the first AP 302, may start its schedule transmission sequence with a delay. In a first option, as shown in FIG. 5A, each of the APs may wait an IFS (e.g., DIFS) and perform CCA. The first AP 302, however, may start its transmission sequence with a delay. The network entity 310 may instruct the first AP 302 to stop transmitting if a transmission would exceed a maximum time interval. For example, the first AP 302 may stop transmitting after Packet A3 and not transmit Packet A4. The second option may be preferred and may also be beneficial for a block acknowledgment procedure.

FIGS. 6A and 6B illustrates diagrams 600, 650 for acknowledging transmissions in a synchronized sequence. For example, referring to FIG. 6A, assuming the second option is utilized, the first and second APs 302, 304 may schedule block acknowledgment requests (BARs) and block acknowledgments (BAs). In an aspect, the BAR may be scheduled following a maximum time interval. In another aspect, the APs may initiate transmission of a BAR when absence of traffic is detected following the data transmission. In an aspect, the BAR and the BA may be hard scheduled. That is, the BAR and the BA may be transmitted after the medium is seen as idle for more than PIFS.

Referring to FIG. 6B, if the late AP (or the first AP 302) is allowed to transmit, then BARs and BA could not be hard scheduled. In this aspect, the APs may use a deterministic backoff with AIFS. The deterministic backoff may have a large AIFS to give the late AP time to finish transmitting the late packet. In an aspect, the sequence in FIG. 6B may be implemented using a cascade, even if the APs are within range of a transmission.

In an aspect, for FIGS. 6A and 6B, the network entity 310 may signal the first and the second APs 302, 304 to set an acknowledgment policy to BAR for all frames. As such, frames may not be acknowledged unless a BAR is included with the frame or separately transmitted after the frame, for example. In another aspect, the APs may transmit a BAR to the STAs during an assigned slot time.

Figure 7:
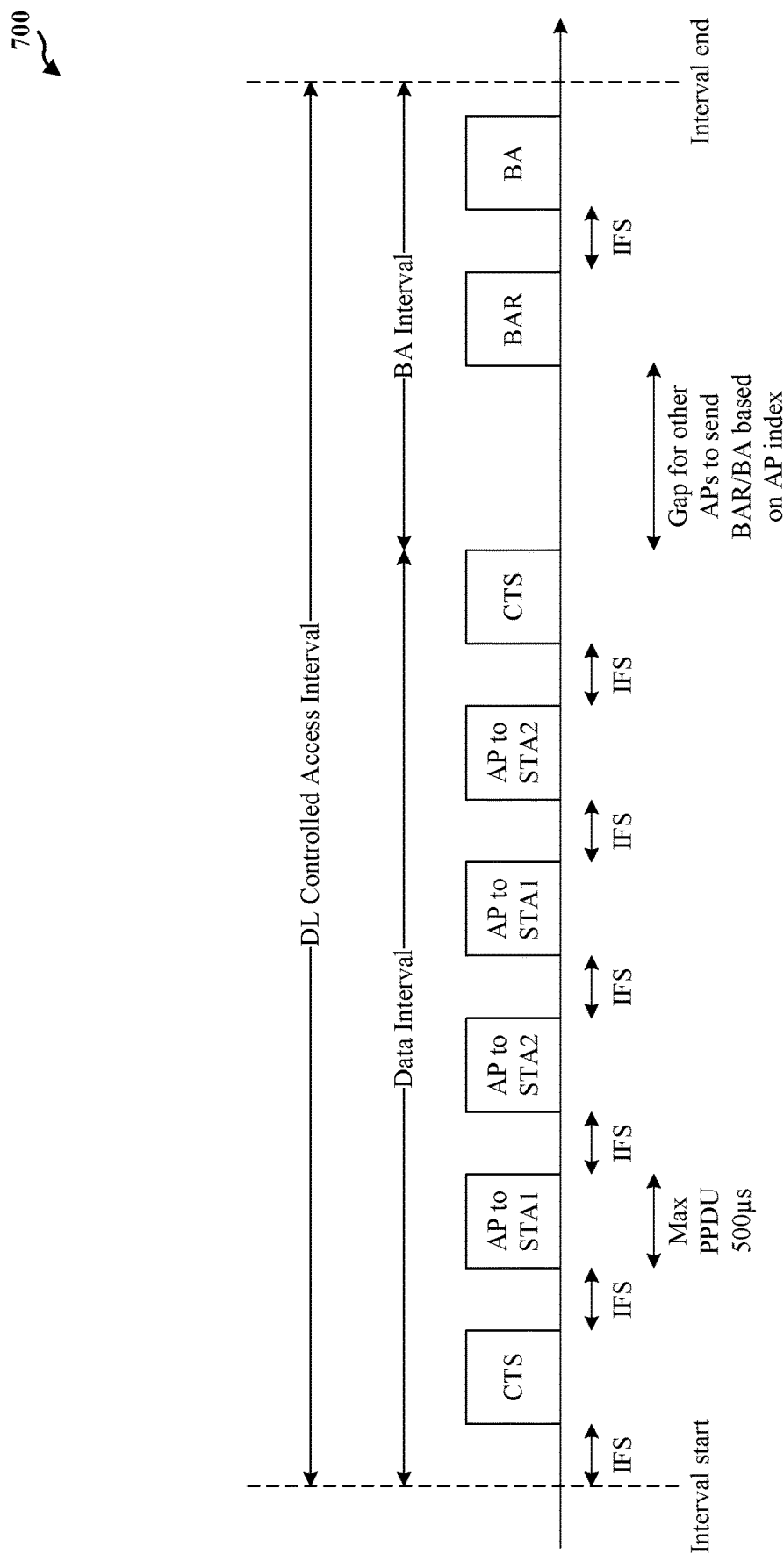
FIG. 7 is a diagram illustrating an exemplary method for communicating over a medium.

FIG. 7 is a diagram 700 illustrating an exemplary method for communicating over a medium. Referring to FIG. 7, in an aspect, communication may occur over a medium when APs are loosely synchronized and are within CCA range. In FIG. 7, APs may be instructed to deterministically collide by using IFS (e.g., PIFS) bursting. Referring to FIG. 7, a downlink controlled access interval may include a data interval for data transmission and a BA interval for BAR and BA transmission. During the data interval, and after an IFS, an AP may transmit a CTS frame. An IFS after the CTS frame is transmitted, the AP may transmit a sequence of packets to its associated STAs. Each packet in the sequence of packets may be separated by a fixed time interval (e.g., PIFS). In another aspect, as shown in the previous FIGs., the AP may transmit the entire packet sequence during the data interval before a BAR or BA is transmitted during the BA interval. After transmitting the packet sequence, the AP may transmit another CTS frame.

Figure 8:
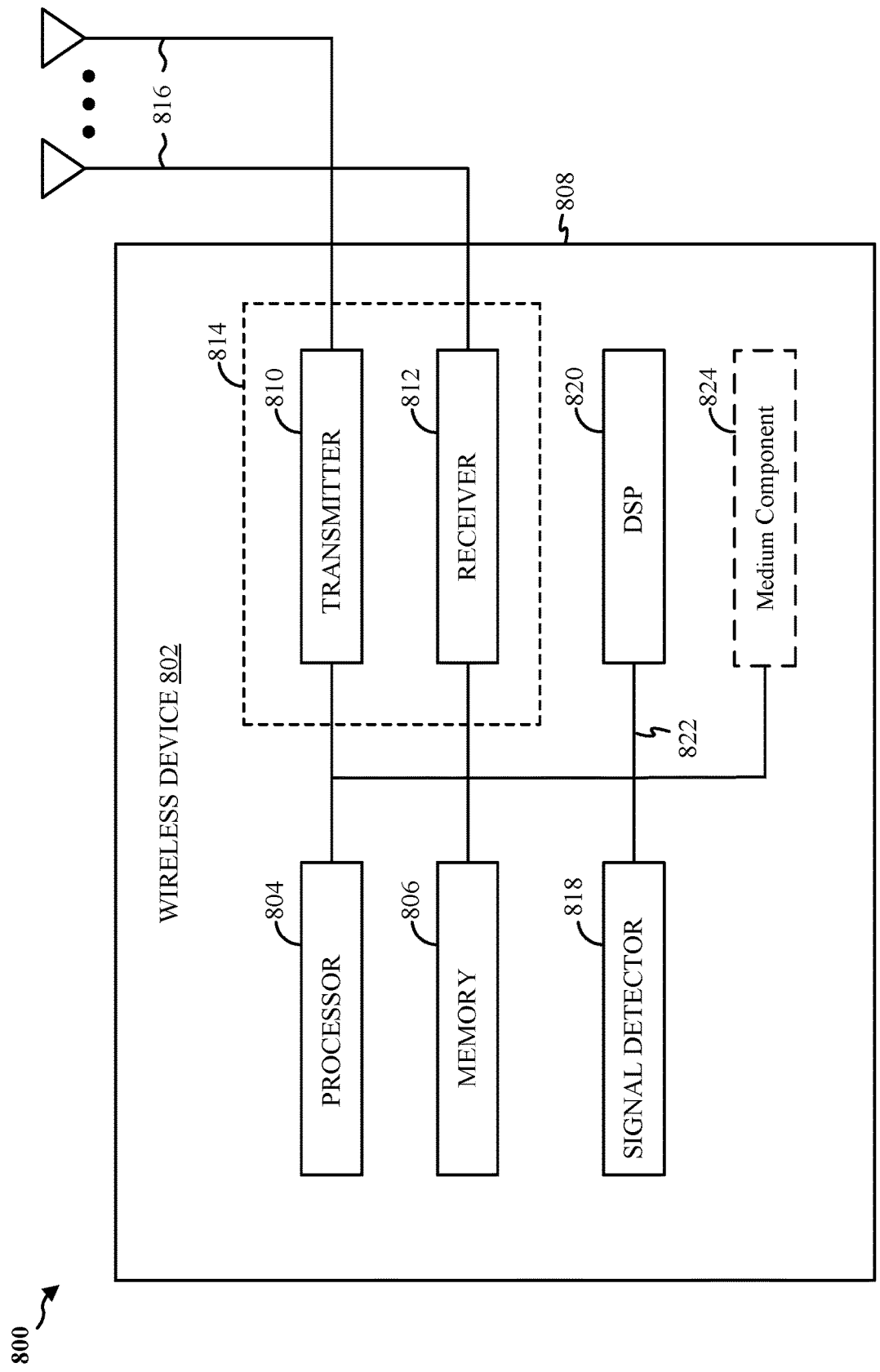
FIG. 8 shows an example functional block diagram of a wireless device configured to communicate over a medium.

FIG. 8 shows an example functional block diagram of a wireless device 802 configured to communicate over a medium. The wireless device 802 is an example of a device that may be configured to implement the various methods described herein. For example, the wireless device 802 may be the AP 110 and/or the UT 120.

The wireless device 802 may include a processor 804 which controls operation of the wireless device 802. The processor 804 may also be referred to as a central processing unit (CPU). Memory 806, which may include both read-only memory (ROM) and random access memory (RAM), may provide instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable (by the processor 804, for example) to implement the methods described herein.

The wireless device 802 may also include a housing 808, and the wireless device 802 may include a transmitter 810 and a receiver 812 to allow transmission and reception of data between the wireless device 802 and a remote device. The transmitter 810 and receiver 812 may be combined into a transceiver 814. A single transmit antenna or a plurality of transmit antennas 816 may be attached to the housing 808 and electrically coupled to the transceiver 814. The wireless device 802 may also include multiple transmitters, multiple receivers, and multiple transceivers.

The wireless device 802 may also include a signal detector 818 that may be used in an effort to detect and quantify the level of signals received by the transceiver 814 or the receiver 812. The signal detector 818 may detect such signals as total energy, energy per subcarrier per symbol, power spectral density and other signals. The wireless device 802 may also include a digital signal processor (DSP) 820 for use in processing signals. The DSP 820 may be configured to generate a packet for transmission. In some aspects, the packet may comprise a PPDU.

The various components of the wireless device 802 may be coupled together by a bus system 822, which may include a power bus, a control signal bus, and a status signal bus in addition to a data bus. The wireless device 802 may include a medium component 824. The medium component 824, which may include one or more interfaces such as a bus interface (e.g., of a processor), may be configured to perform various operations. The medium component 824 may be configured to a first interface configured to obtain a signal from a wireless node. The medium component 824 may be configured to: select operation in a first mode or a second mode in the response to the signal; detect an absence of traffic on the shared medium during a fixed time interval; and initiate the data transmission at the end of the fixed time interval if operating in the first mode or initiate the data transmission at the end of a random time interval following the fixed time interval if operating in the second mode. The medium component 824 may be further configured to initiate the data transmission in the first mode by generating a plurality of data frames separated by the fixed time interval, and further configured to output the plurality of data frames for transmission. The medium component 824 may be further configured terminate the data transmission if a time period associated with the data transmission exceeds a maximum time interval, the time period being after the initiation of the data transmission. The medium component 824 may be further configured to generate a block acknowledgement request, and schedule transmission of the block acknowledgement request following the maximum time interval, and output the block acknowledgement request for the scheduled transmission. The medium component 824 may be further configured to initiate transmission of a block acknowledgement if another absence of traffic is detected on the shared medium following an end of the data transmission. The medium component 824 may be further configured to monitor the shared medium to determine one or more parameters and provide the one or more parameters to a remote wireless node. In an aspect, the one or more parameters comprise at least one of received signal strength from a wireless node in communication with the apparatus or detected interference associated with the shared medium.

Figure 9:
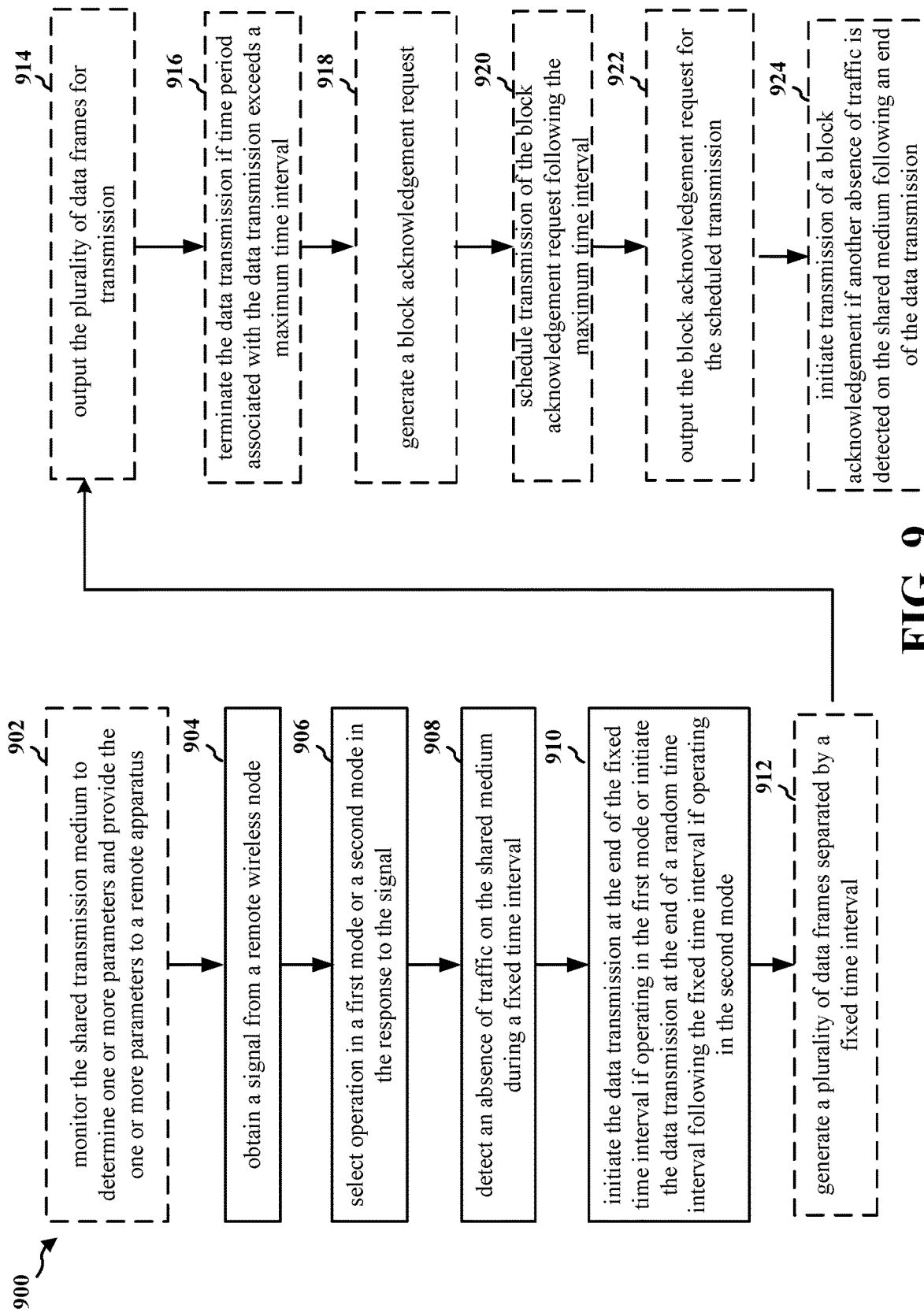
FIG. 9 is a flowchart of a method for communicating over a medium.

FIG. 9 is a flowchart 900 of a method for communicating over a medium. The first method may be performed using an apparatus (e.g., the AP 110, the UT 120, the wireless device 802, or the medium component 824, for example). Although the method is described below with respect to the elements of wireless device 802 of FIG. 8, other components may be used to implement one or more of the steps described herein.

At operation 902, the apparatus may be configured to monitor the shared transmission medium to determine one or more parameters and provide the one or more parameters to a remote apparatus. The apparatus may monitor the shared transmission the shared transmission medium by determining if signals are transmitted on the shared transmission medium and by receiving signals on the shared transmission medium. The apparatus may determine the one or more parameters by measuring the RSSI of the received signals or by measuring an energy detection level on the transmission medium (e.g., interference) and by storing the measurements. In another aspect, the apparatus may determine the one or more parameters by receiving one or more parameters, such as by receiving an RSSI from another wireless node (e.g., STA). For example, the first AP 302 and/or the second AP 304 may monitor the shared transmission medium to determine one or more parameters, and the first AP 302 and/or the second AP 304 may provide the determine one or more parameters to the network entity 310.

At operation 904, the apparatus may obtain a signal from a remote wireless node. For example, the signal may include an instruction configured to cause the apparatus to select between different transmission modes. In an aspect, the remote wireless node may be a network server. In the context of FIG. 3, the first AP 302 may receive the control message 326 from the network entity 310, and/or the second AP 304 may receive the control message 328 from the network entity 310.

At 906, the apparatus may select operation in a first mode or a second mode in response to the signal. For example, the apparatus may switch between a first mode by setting a mode status indicator to a first value or a second value corresponding to the selected mode. For example, the first AP 302 may select operation in the first mode or the second mode in response to the control message 326, and/or the second AP 304 may select operation in the first mode or the second mode in response to the control message 328.

At operation 908, the apparatus may detect an absence of traffic on the shared transmission medium during a fixed time interval. For example, the apparatus may sense the shared transmission medium by determining if any signals are present in the medium (e.g., signals above a signal strength) and, if not, whether the signals are absent or below a signal strength for greater than a time duration. For example, the first AP 302 and/or the second AP 304 may detect an absence of traffic on the shared transmission medium.

At operation 910, the apparatus may initiate the data transmission at the end of the fixed time interval if operating in the first mode or initiate the data transmission at the end of a random time interval following the fixed time interval if operating in the second mode. For example, the apparatus may begin a timer having a duration of the fixed time interval. Upon expiration of the timer, the apparatus may initiate a data transmission if operating in the first mode. If operating in the second mode, the apparatus may additionally wait for a randomly selected time interval to elapse and then initiate the data transmission. For example, the first AP 302 and/or the second AP 304 may initiate a data transmission at the end of a fixed time interval if operating in the first mode. In the first mode, one or more data frames transmitted by the first AP 302 may be synchronized (e.g., concurrent) with one or more data frames transmitted by the second AP 304. In the second mode, the first AP 302 or the second AP 304 may initiate a data transmission at the end of a random time interval following the fixed time interval.

In an aspect, the apparatus may perform operation 912 and/or operation 914 in order to initiate the data transmission at the end of the fixed time interval if operating in the first mode or initiate the data transmission at the end of a random time interval following the fixed time interval if operating in the second mode. At operation 912, the apparatus may generate a plurality of data frames separated by a fixed time interval. For example, the first AP 302 may generate one or more of Packet A1 through A4, and/or the second AP 304 may generate one or more of Packet B2-B5.

At operation 914, the apparatus may output the plurality of data frames for transmission. For example, the first AP 302 may output the one or more of Packet A1 through A4, and/or the second AP 304 may output the one or more of Packet B2-B5.

At operation 916, the apparatus may terminate the data transmission if time period associated with the data transmission exceeds a maximum time interval. For example, the first AP 302 may terminate the data transmission if time period associated with the data transmission exceeds a maximum time interval, and/or the second AP 304 may terminate the data transmission if time period associated with the data transmission exceeds a maximum time interval.

At operation 918, the apparatus may generate a block acknowledgement request. For example, the first AP 302 may generate a block acknowledgement request, and/or the second AP 304 may generate a block acknowledgement request.

At operation 920, the apparatus may schedule transmission of a block acknowledgment request following the maximum time interval. For example, the apparatus may detect the shared transmission medium as idle, and the apparatus may hard schedule the block acknowledgement request following the maximum time interval. For example, the first AP 302 may schedule the block acknowledgement request following the maximum time interval, and/or the second AP 304 may schedule the block acknowledgement request following the maximum time interval.

At operation 922, the apparatus may output the block acknowledgement request for the scheduled transmission. For example, the apparatus may initiate, according to the scheduled transmission, transmission of the block acknowledgment when an absence of traffic is detected following the data transmission. For example, the first AP 302 may output the block acknowledgement request for the scheduled transmission, and/or the second AP 304 may output the block acknowledgement request for the scheduled transmission.

At operation 924, the apparatus may initiate transmission of a block acknowledgement if another absence of traffic is detected on the shared medium following an end of the data transmission. For example, the apparatus may detect another absence of traffic on the shared medium, and may initiate transmission of the block acknowledgement based on the detection of the other absence of traffic. For example, the first AP 302 and/or the second AP 304 may initiate transmission of a block acknowledgement if another absence of traffic is detected on the shared medium following an end of the data transmission.

Figure 10:
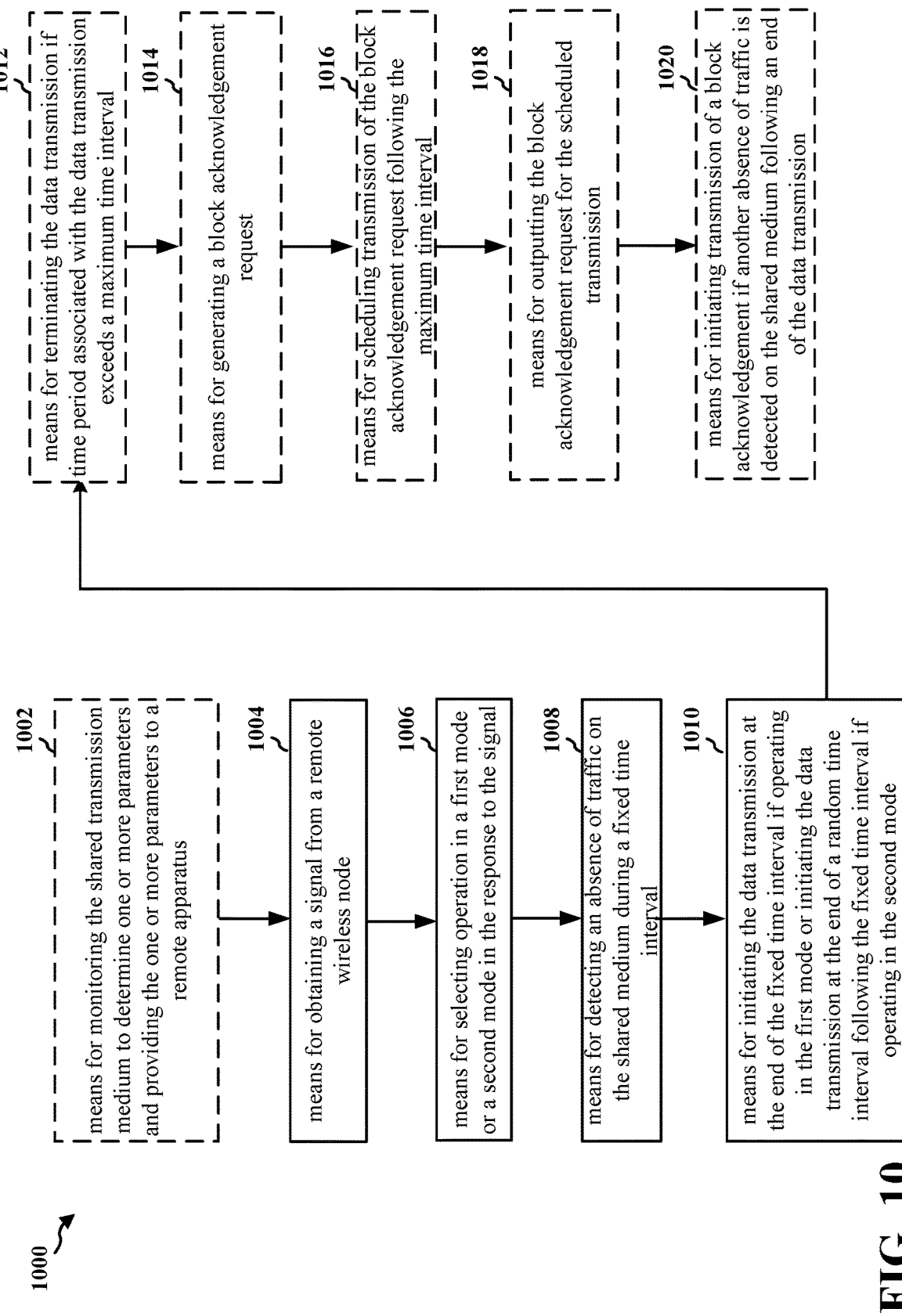
FIG. 10 is a block diagram illustrating exemplary means.

FIG. 10 illustrates exemplary means 1000 capable of performing the operations set forth in FIG. 9. The exemplary means may include means for monitoring the shared transmission medium to determine one or more parameters and providing the one or more parameters to a remote apparatus 1002. Means 1002 may include a bus interface (e.g., of a processor), antennas 224, antennas 252, receiver units 222, receiver units 254, RX spatial processor 240, RX spatial processors 260, RX data processor 242, RX data processors 270, transmitter units 222, transmitter units 254, TX spatial processor 220, TX spatial processors 290, TX data processor 210, TX data processors 288 controller 230, controllers 280, antennas 816, transmitter 810, receiver 812, digital signal processor 820, and/or processor 804 shown in FIG. 2 and FIG. 8.

The exemplary means may include means for obtaining a signal from a remote wireless node 1004. Means 1004 may include a bus interface (e.g., of a processor), antennas 224, antennas 252, receiver units 222, receiver units 254, RX spatial processor 240, RX spatial processors 260, RX data processor 242, RX data processors 270, controller 230, controllers 280, antennas 816, receiver 812, digital signal processor 820, and/or processor 804 shown in FIG. 2 and FIG. 8.

The exemplary means may include means for selecting operation in a first mode or a second mode in the response to the signal 1006. Means 1006 may include controller 230, controllers 280, digital signal processor 820, and/or processor 804 shown in FIG. 2 and FIG. 8.

The exemplary means may include means for detecting an absence of traffic on the shared medium during a fixed time interval 1008. Means 1008 may include a bus interface (e.g., of a processor), antennas 224, antennas 252, receiver units 222, receiver units 254, RX spatial processor 240, RX spatial processors 260, RX data processor 242, RX data processors 270, controller 230, controllers 280, antennas 816, receiver 812, digital signal processor 820, and/or processor 804 shown in FIG. 2 and FIG. 8.

The exemplary means may include means for initiating the data transmission at the end of the fixed time interval if operating in the first mode or initiating the data transmission at the end of a random time interval following the fixed time interval if operating in the second mode 1010. In an aspect, means 1010 may be configured to generate a plurality of data frames separated by a fixed time interval. In an aspect, means 1010 may be configured to output the plurality of data frames for transmission. Means 1010 may include a bus interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 816, transmitter 810, digital signal processor 820, and/or processor 804 shown in FIG. 2 and FIG. 8.

The exemplary means may include means for terminating the data transmission if time period associated with the data transmission exceeds a maximum time interval 1012. Means 1012 may include a controller 230, controllers 280, digital signal processor 820, and/or processor 804 shown in FIG. 2 and FIG. 8.

The exemplary means may include means for means for generating a block acknowledgement request 1014. Means 1014 may include controller 230, controllers 280, digital signal processor 820, and/or processor 804 shown in FIG. 2 and FIG. 8.

The exemplary means may include means for scheduling transmission of the block acknowledgement request following the maximum time interval 1016. Means 1016 may include controller 230, controllers 280, digital signal processor 820, and/or processor 804 shown in FIG. 2 and FIG. 8.

The exemplary means may include means for outputting the block acknowledgement request for the scheduled transmission 1018. Means 1018 may include a bus interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 816, transmitter 810, digital signal processor 820, and/or processor 804 shown in FIG. 2 and FIG. 8.

The exemplary means may include means for initiating transmission of a block acknowledgement if another absence of traffic is detected on the shared medium following an end of the data transmission 1020. Means 1020 may include a bus interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 816, transmitter 810, digital signal processor 820, and/or processor 804 shown in FIG. 2 and FIG. 8.

In the exemplary means 1000, one or more means may be at least partially the same means. For example, means 1004 may include a first interface for obtaining the signal and means 1010 may include a second interface for outputting the plurality of data frames. Potentially, the first interface and the second interface may be the same interface.

The various operations of methods described above may be performed by any suitable means capable of performing the operations. The means may include various hardware and/or software component(s) and/or module(s), including, but not limited to a circuit, an application specific integrated circuit (ASIC), or processor. Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover a, b, c, a-b, a-c, b-c, and a-b-c, and also a-a, b-b, and c-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a first apparatus, comprising:
   receiving a first message associated with synchronized transmission on a wireless channel; and
   initiating transmission of a first sequence of packets based on a schedule for the synchronized transmission with at least one second apparatus on the wireless channel, wherein the schedule is based on the first message, wherein a first start time of the first sequence of packets and a second start time of at least one second sequence of packets transmitted by the at least one second apparatus are synchronized on the wireless channel, and wherein a first packet of the first sequence of packets is separated in time from a second packet of the first sequence of packets based on a first coordinated interframe space (IFS) period that is for the first apparatus and the at least one second apparatus.

2. The method of claim 1, wherein a first length of at least one of the first sequence of packets differs from a second length of at least one of the at least one second sequence of packets.

3. The method of claim 2, wherein each of the first and second lengths is less than a packet length threshold.

4. The method of claim 1, wherein a first end time of at least one of the first sequence of packets is unsynchronized on the wireless channel with a second end time of at least one of the at least one second sequence of packets.

5. The method of claim 1, further comprising:
   detecting an absence of traffic on the wireless channel,
   wherein the transmission of the first sequence of packets is initiated further based on the absence of traffic.

6. The method of claim 5, further comprising:
   performing a clear channel assessment (CCA) procedure on the wireless channel,
   wherein the absence of traffic on the wireless channel is detected based on the CCA procedure.

7. The method of claim 5, wherein the absence of traffic on the wireless channel is detected during a second coordinated interframe space (IFS) period.

8. The method of claim 1, further comprising:
   determining the wireless channel is busy; and
   deferring the transmission of the first sequence of packets based on the wireless channel being busy,
   wherein the transmission of the first sequence of packets is initiated after deferring the transmission of the first sequence of packets.

9. The method of claim 8, further comprising:
   detecting energy on the wireless channel; and
   comparing the energy to a threshold,
   wherein the wireless channel is determined to be busy based on the energy compared to the threshold.

10. A first apparatus, comprising:
    means for receiving a first message associated with synchronized transmission on a wireless channel; and
    means for initiating transmission of a first sequence of packets based on a schedule for the synchronized transmission with at least one second apparatus on the wireless channel, wherein the schedule is based on the first message, wherein a first start time of the first sequence of packets and a second start time of at least one second sequence of packets transmitted by the at least one second apparatus are synchronized on the wireless channel, and wherein a first packet of the first sequence of packets is separated in time from a second packet of the first sequence of packets based on a first coordinated interframe space (IFS) period that is for the first apparatus and the at least one second apparatus.

11. The first apparatus of claim 10, wherein a first length of at least one of the first sequence of packets differs from a second length of at least one of the at least one second sequence of packets.

12. The first apparatus of claim 11, wherein each of the first and second lengths is less than a packet length threshold.

13. The first apparatus of claim 10, wherein a first end time of at least one of the first sequence of packets is unsynchronized on the wireless channel with a second end time of at least one of the at least one second sequence of packets.

14. The first apparatus of claim 10, further comprising:
    means for detecting an absence of traffic on the wireless channel,
    wherein the transmission of the first sequence of packets is initiated further based on the absence of traffic.

15. The first apparatus of claim 14, further comprising:
    means for performing a clear channel assessment (CCA) procedure on the wireless channel,
    wherein the absence of traffic on the wireless channel is detected based on the CCA procedure.

16. The first apparatus of claim 14, wherein the absence of traffic on the wireless channel is detected during a second coordinated interframe space (IFS) period.

17. The first apparatus of claim 10, further comprising:
    means for determining the wireless channel is busy; and
    means for deferring the transmission of the first sequence of packets based on the wireless channel being busy,
    wherein the transmission of the first sequence of packets is initiated after deferring the transmission of the first sequence of packets.

18. The first apparatus of claim 17, further comprising:
    means for detecting energy on the wireless channel; and
    means for comparing the energy to a threshold,
    wherein the wireless channel is determined to be busy based on the energy compared to the threshold.

19. A first apparatus, comprising:
a memory; and
at least one processor coupled to the memory and configured to:
receive a first message associated with synchronized transmission on a wireless channel; and
initiate transmission of a first sequence of packets based on a schedule for the synchronized transmission with at least one second apparatus on the wireless channel, wherein the schedule is based on the first message, wherein a first start time of the first sequence of packets and a second start time of at least one second sequence of packets transmitted by the at least one second apparatus are synchronized on the wireless channel, and wherein a first packet of the first sequence of packets is separated in time from a second packet of the first sequence of packets based on a first coordinated interframe space (IFS) period that is for the first apparatus and the at least one second apparatus.

20. The first apparatus of claim 19, wherein a first length of at least one of the first sequence of packets differs from a second length of at least one of the at least one second sequence of packets.

21. The first apparatus of claim 20, wherein each of the first and second lengths is less than a packet length threshold.

22. The first apparatus of claim 19, wherein a first end time of at least one of the first sequence of packets is unsynchronized on the wireless channel with a second end time of at least one of the at least one second sequence of packets.

23. The first apparatus of claim 19, wherein the at least one processor is further configured to:
detect an absence of traffic on the wireless channel,
wherein the transmission of the first sequence of packets is initiated further based on the absence of traffic.

24. The first apparatus of claim 23, wherein the at least one processor is further configured to:
perform a clear channel assessment (CCA) procedure on the wireless channel,
wherein the absence of traffic on the wireless channel is detected based on the CCA procedure.

25. The first apparatus of claim 23, wherein the absence of traffic on the wireless channel is detected during an interframe space (IFS) period.

26. The first apparatus of claim 19, wherein the at least one processor is further configured to:
determine the wireless channel is busy; and
defer the transmission of the first sequence of packets based on the wireless channel being busy,
wherein the transmission of the first sequence of packets is initiated after deferring the transmission of the first sequence of packets.

27. The first apparatus of claim 26, wherein the at least one processor is further configured to:
detect energy on the wireless channel; and
compare the energy to a threshold,
wherein the wireless channel is determined to be busy based on the energy compared to the threshold.

28. A non-transitory, computer-readable medium storing computer-executable code for wireless communication by a first apparatus, the code when executed by a processor cause the processor to:
receive a first message associated with synchronized transmission on a wireless channel; and
initiate transmission of a first sequence of packets based on a schedule for the synchronized transmission with at least one second apparatus on the wireless channel, wherein the schedule is based on the first message, wherein a first start time of the first sequence of packets and a second start time of at least one second sequence of packets transmitted by the at least one second apparatus are synchronized on the wireless channel, and wherein a first packet of the first sequence of packets is separated in time from a second packet of the first sequence of packets based on a first coordinated interframe space (IFS) period that is for the first apparatus and the at least one second apparatus.

29. The computer-readable medium of claim 28, wherein a first length of at least one of the first sequence of packets differs from a second length of at least one of the at least one second sequence of packets.

30. The computer-readable medium of claim 28, wherein a first end time of at least one of the first sequence of packets is unsynchronized on the wireless channel with a second end time of at least one of the at least one second sequence of packets.

* * * * *